(12) United States Patent
Trato

(10) Patent No.: US 6,767,398 B2
(45) Date of Patent: Jul. 27, 2004

(54) CEMENTITIOUS COMPOSITIONS AND CEMENTITIOUS SLURRIES FOR PERMANENTLY PLUGGING ABANDONED WELLS AND PROCESSES AND METHODS THEREFOR

(76) Inventor: James H. Trato, P.O. Box 7481, Laguna Niguel, CA (US) 92607

( * ) Notice: Subject to any disclaimer, the term of this patent is extended or adjusted under 35 U.S.C. 154(b) by 181 days.

(21) Appl. No.: 10/014,653

(22) Filed: Oct. 26, 2001

(65) Prior Publication Data

US 2002/0073897 A1 Jun. 20, 2002

Related U.S. Application Data

(60) Provisional application No. 60/244,330, filed on Oct. 30, 2000.

(51) Int. Cl.$^7$ ................................................ C04B 7/26
(52) U.S. Cl. ........................................................ 106/751
(58) Field of Search ......................................... 106/751

(56) References Cited

U.S. PATENT DOCUMENTS

| | | | | |
|---|---|---|---|---|
| 2,871,133 A | * | 1/1959 | Palonen et al. ............. | 106/751 |
| 4,031,184 A | * | 6/1977 | McCord ...................... | 423/197 |
| 4,268,316 A | | 5/1981 | Wills, Jr. .................... | 106/97 |
| 4,341,562 A | * | 7/1982 | Ahlbeck ...................... | 106/707 |
| 4,407,677 A | * | 10/1983 | Wills, Jr. ..................... | 106/716 |
| 4,432,800 A | | 2/1984 | Kneller et al. ................ | 106/85 |
| 4,992,102 A | * | 2/1991 | Barbour ...................... | 106/645 |
| RE33,747 E | | 11/1991 | Hartley et al. .............. | 405/266 |
| 5,266,111 A | * | 11/1993 | Barbour ...................... | 106/709 |

FOREIGN PATENT DOCUMENTS

| | | | |
|---|---|---|---|
| WO | WO 86/05773 | * | 10/1986 |

* cited by examiner

*Primary Examiner*—Elizabeth D. Wood
(74) *Attorney, Agent, or Firm*—F. Eugene Logan

(57) ABSTRACT

A dry cementitious composition which when slurried with water produces an economical hydraulic cementitious slurry for closing abandoned wells. The dry cementitious composition is a cement/CKD blend as the major component with a weight ratio of parts cement to parts of CKD between about 2/3 and about 3/1. Hydraulic cementitious slurries when cured can produce hard cementitious bodies which will meet or exceed the API specification for a competent hard plug. A process for blending the cement and CKD during transit from the cement source to the off-load site without requiring further blending after off-loading. Methods are provided for determining the formulation having the cheapest cost per unit volume of hydraulic cementitious slurry thereby enabling competitive quotes based on cf of hydraulic cementitious slurry required.

16 Claims, 4 Drawing Sheets

```
┌─────────────────────────────────────────────────┐
│ AT A CEMENT MANUFACTURING SITE, LOADING A       │
│ PREDETERMINED AMOUNT OF CKD INTO A SUITABLE     │
│ CONTAINER FOR TRANSPORTING TO A WELL SITE       │
└─────────────────────────────────────────────────┘
                        │
                        ▼
┌─────────────────────────────────────────────────┐
│ AT THE SAME CEMENT MANUFACTURING SITE,          │
│ LOADING A PREDETERMINED AMOUNT OF CEMENT INTO   │
│ THE SUITABLE CONTAINER                          │
└─────────────────────────────────────────────────┘
                        │
                        ▼
┌─────────────────────────────────────────────────┐
│ TRANSPORTING THE CONTAINER WITH THE             │
│ PREDETERMINED AMOUNTS OF CKD AND CEMENT TO AN   │
│ OFF-LOADING SITE AND ALLOWING NORMAL            │
│ VIBRATION DURING THE TRANSPORTING TO MIX THE    │
│ CKD AND CEMENT IN THE CONTAINER                 │
└─────────────────────────────────────────────────┘
                        │
                        ▼
┌─────────────────────────────────────────────────┐
│ OFF-LOADING THE MIXED CKD AND                   │
│ CEMENT AT AN WELL SITE                          │
└─────────────────────────────────────────────────┘
                        │
                        ▼
┌─────────────────────────────────────────────────┐
│ SLURRYING THE MIXED CKD AND CEMENT WITH A       │
│ PREDETERMINED AMOUNT OF WATER AT THE WELL       │
│ SITE THEREBY PRODUCING A SLURRY EFFECTIVE FOR   │
│ INJECTION INTO AN ABANDONED WELL                │
└─────────────────────────────────────────────────┘
```

FIG. 2

CEMENTITIOUS COMPOSITIONS AND CEMENTITIOUS SLURRIES FOR PERMANENTLY PLUGGING ABANDONED WELLS AND PROCESSES AND METHODS THEREFOR

CROSS-REFERENCE TO RELATED APPLICATIONS

This application claims the benefit of the priority of U.S. Provisional Application Ser. No. 60/244,330, filed Oct. 30, 2000 and entitled "CEMENTITIOUS COMPOSITIONS AND CEMENTITIOUS SLURRIES FOR PERMANENTLY PLUGGING ABANDONED WELLS AND PROCESSES AND METHODS THEREFOR."

BACKGROUND

Wells of various types after their useful lives are shut down and usually permanently plugged for a variety of reasons. Frequently, depleted hydrocarbon producing wells are required by laws to be permanently plugged for protecting aquifers and the above surface environment.

Regulations exist for plugging abandoned wells to protect both below and above surface environments and to prevent accidents from occurring at the plugged well. Such regulations often require that the plugs have a certain minimum strength and maximum liquid permeability. Governmental agencies often are required to inspect and approve hydrocarbon well closures before the wells can be officially certified as closed. For example, in the State of California the certifying agency is the Department of Conservation, Division of Oil and Gas.

Although approved well-closure compositions exists, since permanently plugged wells are no longer a source of income, there is a strong economic incentive to permanently plug such wells as cheaply as possible. This invention is directed to cheaper cementitious compositions for permanently plugging wells, processes of preparation of such compositions, processes for applying such compositions, and methods having advantages of reducing the costs of such operations including estimating cost and markup or bid prices.

In the abandonment of hydrocarbon wells, hydraulic cementitious slurries are used to create hard plugs in the wellbore which are effective for permanently closing the well. Specialized equipment is used to inject the slurry into the well at surface level. Under pressure the slurry is forced to the bottom of the well and into the subterranean porosity zone. As the slurry fills in at the well bottom, sufficient resistance is met to cause the slurry to lift vertically towards the surface. Based on the diameter and depth of a given well, the volume of hydraulic cementitious slurry required to close a particular well can be calculated. The slurry must produce upon curing a vertical hard plug to a level of 100 ft. above the subterranean porosity zone.

The performance of a given slurry mix for hydrocarbon well closure is required to meet the American Petroleum Institute ("API") specification for a competent hard plug. As defined by API, a hard plug must meet and maintain a compressive strength of 1000 psi and have a maximum permeability of 0.1 millidarcy ("md").

Many hydrocarbon production companies contract well abandonment work to service organizations that specialize in well closure services. These service organizations use approved cementitious materials in the slurry mixes for placing and forming the competent hard plugs. G series Portland cement and minus 200 sieve silica product are currently approved materials for well plug slurries. By the term "silica product" as used herein is meant a solid material whose major component is silica and is widely used in hydraulic cements. Generally in such silica products the amount of silica exceeds about 95% and is usually about 98% to about 99%. As used herein, the term silica product does not included cement kiln dust ("CKD"). These materials are relatively high cost products individually when compared to the dry cementitious solids of this invention. A typical silica product suitable for forming hydraulic cementitious slurries is from about minus 90 mesh silica sand to about minus 200 mesh silica powder.

In current conventional well abandonment operations, G Series Portland cement is obtained from cement manufacturers and the silica product from other manufacturers at other locations. Transportation cost from two different locations are incurred. Before the cement and silica product are used to form the hydraulic cementitious slurry they must be blended, and thereafter slurried with water, before pumping down the well, as illustrated in FIG. 1.

SUMMARY

Accordingly, this invention is directed to less costly dry cementitious solids for slurry use and a process for blending such dry cementitious solids which have the advantage of greatly reducing the cost of hydrocarbon well abandonment and closing.

In general this invention is directed towards dry cementitious solids comprising cement kiln dust ("CKD") and cement: hydraulic cementitious slurries produced from such dry cementitious solids; the solid cementitious compositions resulting from the curing of such hydraulic cementitious slurries; processes for making and using such materials; methods of blending the dry cementitious solids prior to slurrying; and methods for estimating and reducing cost and estimating price markup in well closure operations using the CKD-containing formulations of this invention.

CKD is a waste material generated in cement manufacture. CKD is a partially calcined kiln feed which is removed from the gas stream and collected in a dust collector. Chemical analysis of CKD from cement manufacturers usually varies depending on the particular feed. Variations also exist from one manufacture to another depending in part on the efficiencies of the cement production operation and the associated dust collection systems. Typically, the major oxides found in CKD's are $SiO_2$, $Al_2O_3$, $Fe_2O_3$, CaO, MgO, $SO_3$, $Na_2O$ and $K_2O$. Chemical analysis of some CKD's are found in U.S. Pat. Nos. 4,432,800 and Re. 33,747 which are hereby incorporated herein by reference. Such variations, however, do not have any detrimental effects on the usefulness and performance of this invention.

CKD is available from a number of cement manufacturers at a price significantly lower than the cost of materials currently being used in cementitious slurries for hydrocarbon well closures. Type II Portland cement is cheaper than G Series Portland cement by about $2.00 per ton based on raw cost. Since the resulting hard cores produced by this invention using Type II Portland cement meet or exceed all requirements of API for a competent hard plug, Type II Portland cement is preferred only for achieving better economics. Of course, if desired the more expensive G Series Portland cement can also be used. In fact, any type of cement can be used in this invention.

In the economics of hydrocarbon abandonment service contracts, the profits are determined by a charged cost per cubic foot ("cf") of slurry, which in turn is determined by the choice of materials, the transportation cost, and the blending cost. This invention is also directed to processes for reducing the cost of well closures.

CKD is made available by a number of cement manufactures so that both the CKD and the cement can be obtained from the same source essentially at the same source location thereby reducing transportation cost. CKD is often regarded as a waste product of the cement industry having limited use elsewhere.

BRIEF DESCRIPTION OF THE DRAWINGS

FIG. 2 is a flow diagram for a process for producing a hydraulic cementitious slurry formed from a cement-CKD blend into an abandoned well.

PREFERRED EMBODIMENTS

Figure 1:
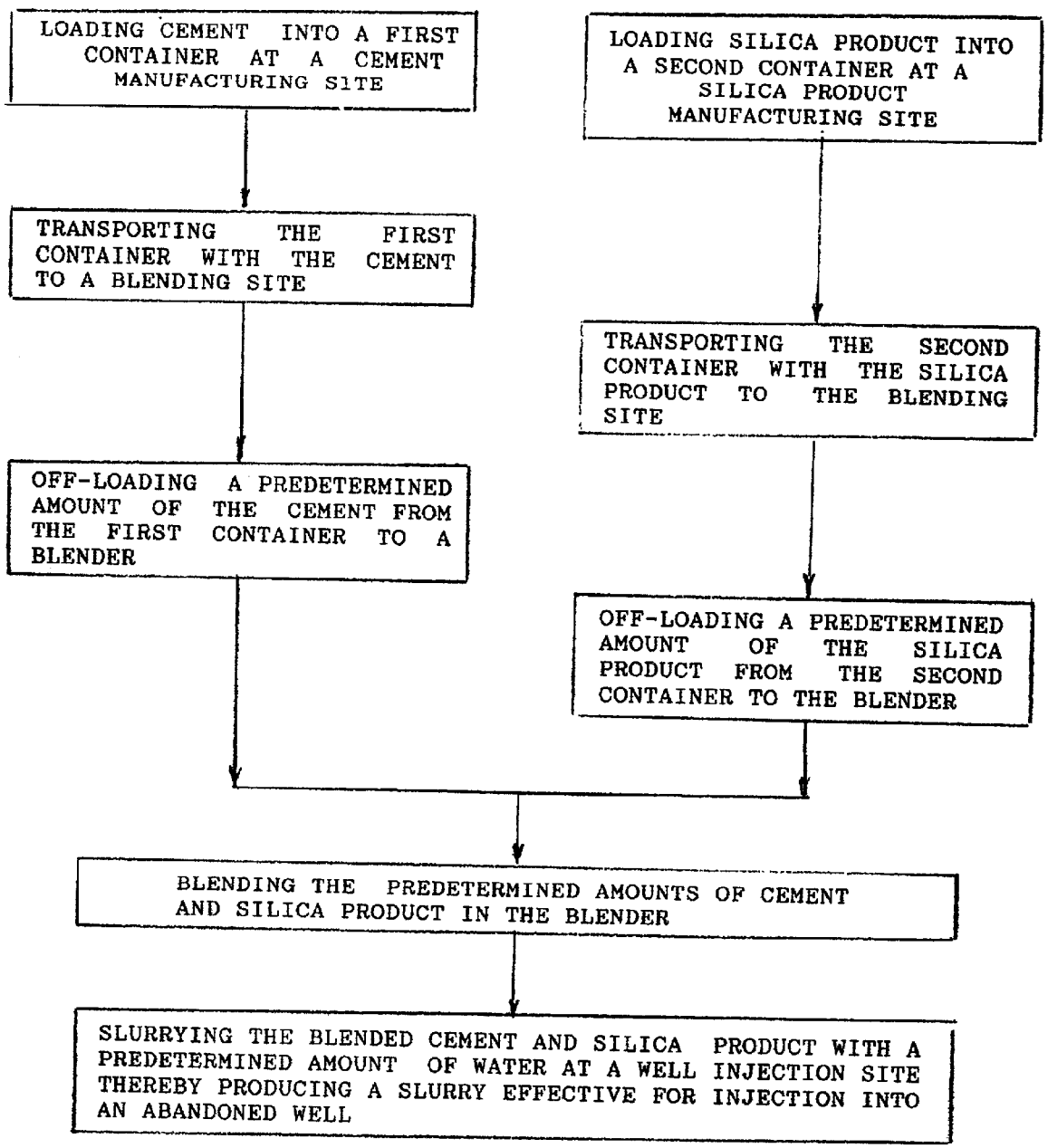
FIG. 1 is a flow diagram for a process for producing a blended cementitious slurry of cement and silica into an abandoned well.

FIG. 2 illustrates one embodiment of this invention producing a slurry effective for injection into an abandoned well intended to be closed.

In this invention blending of the dry cementitious solids is achieved by loading in a suitable transporting container a predetermined weight of CKD and, thereafter, loading in the same container, a predetermined weight of cement on top of the CKD. The amount of CKD and cement corresponds to a predetermined ratio of such dry cementitious solids. In other words, the loaded dry cementitious solids in the container have the predetermined weight ratio of "cement/CKD" required for preparing the final hydraulic cementitious slurry by merely adding water and slurrying for use in a particular well.

In one embodiment of this invention, blending of the dry cementitious solids is accomplished automatically during transportation at no additional cost by taking advantage of the different specific gravities and bulk densities of CKD and cement. For example, Type II Portland cement has a specific gravity ("SG") of about 3.14 and a bulk density of about 94 lbs/cf. On an average CKD has a SG of from about 2.6 to about 2.9 and a bulk density of from about 48 to about 55 lbs/cf. The CKD variations result from differences in raw kiln feed, cement production efficiencies and associated CKD collection systems that exist from one cement manufacturer to another and from one kiln to another kiln of the same cement manufacturer. Such CKD variations do not have any detrimental effects that prevent their use in this invention.

The particle size of both the cement and CKD are in a range of from about 300 to about 325 sieve mesh. On average transportation of the dry cementitious solids will be in the range of 50 to 100 miles as measured from the cement source site to the off-load site. Normal vibration generated during such travel will cause some of the heavier density cement to work its way down in the container thereby displacing some of the lighter density CKD and causing the CKD to rise, thereby blending the materials in the container automatically while in transit sufficiently for slurrying with water without further blending after off-loading. Pneumatic off-loadable trucks and railroad cars, for example, have containers suitable for transportation of such dry cementitious solids. Just prior to off-loading the dry cementitious solids the containers are aerated or purged to remix any concentration of cement in the bed of the container.

In this invention, the blending of CKD and cement, preferably Type II Portland cement, in specific ratios, when slurried with water in predetermined amounts, will produce a variety of slurries that will achieve a compressive strength at least of 1000 psi and meet or exceed all requirements of API for a competent hard plug.

Accordingly, there is provided by the principles of this invention, novel cementitious compositions and hydraulic cementitious slurries using CKD as one of the major components thereof.

In one embodiment of this invention, the cement is Type II Portland cement, however, any type of cement can be used if desired.

In another embodiment of this invention, the CKD has at least about 10% free lime as determined by analysis. All percents herein, unless otherwise specified, are weight percents. By the term "free lime" as used herein is meant calcium existing in the form of calcium oxide, i.e. CaO.

In still another embodiment of this invention, the CKD has at least about 40% CaO as determined by analysis on an oxide basis.

In one embodiment of this invention, a dry cementitious composition is provided, which when slurried with water, is effective for permanently plugging a well. The dry cementitious composition comprises CKD and cement as the major components. In a further embodiment, the CKD is at least about 40% by weight of the dry cementitious composition. In another further embodiment, the cement is at least about 40% by weight of the dry cementitious composition.

In another embodiment, the dry cementitious composition is about 50% by weight CKD, and about 50% by weight cement.

In still another embodiment, the dry cementitious composition is about 60% by weight CKD and about 40% by weight cement.

In one embodiment of this invention, a dry cementitious composition is provided which comprises cement and CKD as major components and which also has a weight ratio of parts of cement to parts of CKD between about 2/3 and 3/1.

In further embodiment, the dry cementitious composition is at least about 70% by weight cement and CKD. In a still further embodiment, the dry cementitious composition is at least about 90% by weight cement and CKD.

In further embodiment, the dry cementitious composition has a weight ratio of parts of cement to parts of CKD between about 2/3 and about 7/3, and preferably between about 2/3 and about 3/2.

In hot wells, to prevent boiling of the hydraulic cementitious slurry, the slurry can also contain a predetermined amount of silica flour. Silica flour is fine silica, generally about minus 325 mesh.

In a further embodiment, the dry cementitious composition also contains silica flour. In a still further embodiment, the dry cementitious composition has a weight ratio of parts of silica flour to parts of cement of from about 0.30 to about 0.40.

In the cement industry, the unit weight of dry cement and cementitious materials is a "sack." A sack is defined as 94 lbs. of dry cementitious material. Thus a sack can contain only cement, or a mixture of cement and CKD, or a mixture of any other cementitious formulation.

Examples of the formulations of three embodiments of this invention are shown in Table I. Tested hard plugs produced by this invention in accordance with the formulations in Table I, meet or exceed API specifications.

TABLE I

| Formulation | A | B | C |
|---|---|---|---|
| Dry cementitious materials: | | | |
| % cement | 40 | 50 | 60 |
| % CKD | 60 | 50 | 40 |
| Gallons of water per sack: | 6.5 | 8 | 10 |

Table II illustrates load data of laboratory tested cores prepared from formulations of this invention, where CKD and cement from Source I of Table IV have been used to prepare hard cores. Tests of the hard cores in Table II were conducted in accordance with ASTM C-39 specification.

Table II shows that the compressive strengths of cured samples produced by this invention increases with curing time. In these examples, the SG of the Type II Portland cement was 3.14 and the SG of the CKD was 2.8.

Yield ("Y") is the cubic feet of slurry produced per sack of cementitious material after slurrying with a predetermined amount of water. In this case the sack is a 94 lb. mixture of cement and CKD. Density of the slurry is usually expressed in lb/cf. Usually both yield and density are calculated. The calculated yield is the sum of the volumes of each component per sack which at ambient conditions is equal to $$0.01506 \times \left( \frac{\% \text{ cement}}{SG \text{ cement}} + \frac{\% \text{ } CKD}{SG \text{ } CKD} \right) + 0.1337 \times (\text{gal. of water}) \quad \text{Eq. 1}$$

The calculated density ("D") is the sum of the weights of each component per sack divided by the sum of the volumes of each component per sack, which is equal to $$(94 \text{ lb} + \{8.337 \times (\text{gal. of water})\})/Y \quad \text{Eq. 2}$$

Payment is usually based on the number of cubic feet of slurry used for a well closure operation. Therefore, for a given load and compressive strength requirement for closure of a given well, the cementitious slurry which is the cheapest per cf, while still meeting particular requirements for the well, is economically advantageous for a well closure operation. The cementitious slurry which is the cheapest includes the cost of the cementitious composition from the cement manufacturer, the cost of blending, and the cost of transportation and off-loading at the off-loading site. In this invention, however, there is no cost of blending since blending of the cement and CKD is achieved automatically during transit from the cement manufacture to the off-load site. Both sack cost and yield are factors in determining the cementitious composition cost. This invention also provides a method of estimating such cost and markup prices.

Table III is an example of the yields and densities of typical prior art formulations using G Series Portland cement and silica product as the cementitious materials which when mixed with water produced a cementitious slurry which meets API specifications. In this example the SG of the G Series Portland cement is 3.15 and the SG of the silica product is 2.65. The bulk density of the G Series Portland cement is 94 lb/cf and the bulk density of the silica product is 74 lb/cf. The typical cost per cf of just the raw ingredients, i.e. exclusive of transportation and blending, is estimated to range from about $1.06 to about $1.55.

Figure 3:
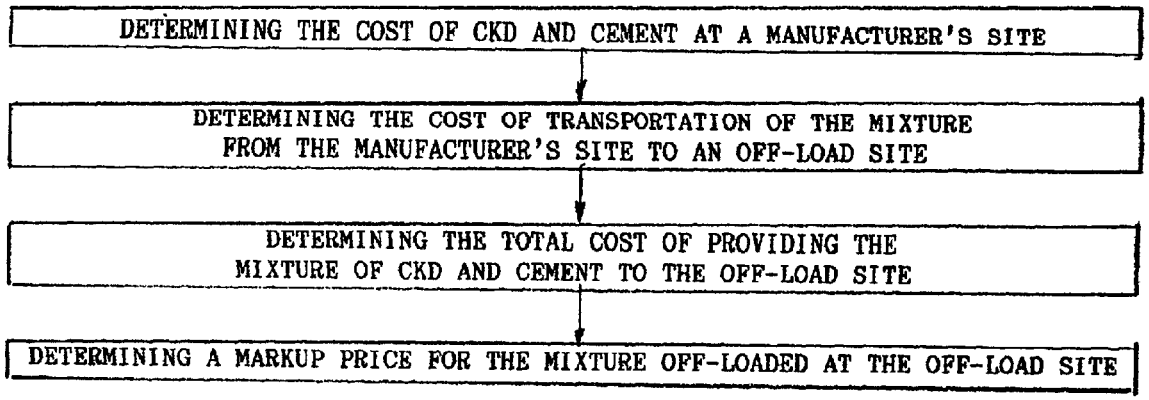
FIG. 3 is a flow diagram for a method of determining a markup price for providing a cement-CKD blend to an off-load site.

Table IV shows the chemical analysis on a major oxide bases of several typical CKD by different cement manufacturers. This data was supplied by Sources I, II and III, and taken from U.S. Pat. No. 4,432,800 for Sources IV, V and VI. Slurries produced by this invention using the CKD from these sources will meet or exceed API specifications. Although almost any CKD from any cement manufacturer can be used in this invention with adjustment of the cement to CKD ratio, CKD from some sources will be preferred over others depending on the particular chemistry of the CKD and/or the cost of transportation There is also provided by the principles of this invention a method for determining a price for providing a mixture of CKD and cement to a well site comprising determining the cost of CKD and cement at a manufacturer's site, determining the cost of transportation of the mixture from the same manufacturer's site to an off-load site, determining the total slurry cost of providing the mixture of CKD and cement to the off-load site, and determining a markup price for the mixture off-loaded at the off-load site as illustrated in FIG. 3.

Figure 4:
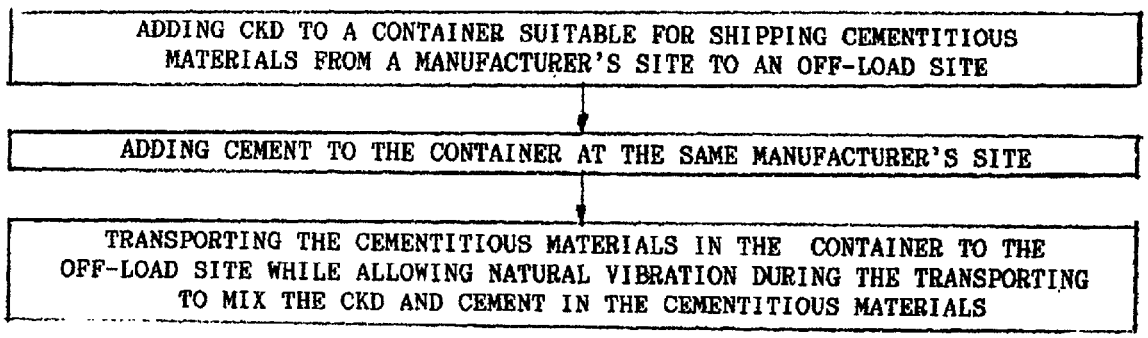
FIG. 4 is a flow diagram for a process for producing and transporting a cement-CKD blend to an off-load site.

There is also provided by the principles of this invention a process of forming a blended mixture of CKD and cement comprising adding CKD to a container suitable for shipping cementitious materials from a manufacturer's site to an off-load site, thereafter, adding cement to the same container on top of the cement at the same manufacturer's site, and transporting the cementitious materials in the container to the off-load site while allowing natural vibration during the transporting to blend the CKD and cement as illustrated in FIG. 4.

Figure 5:
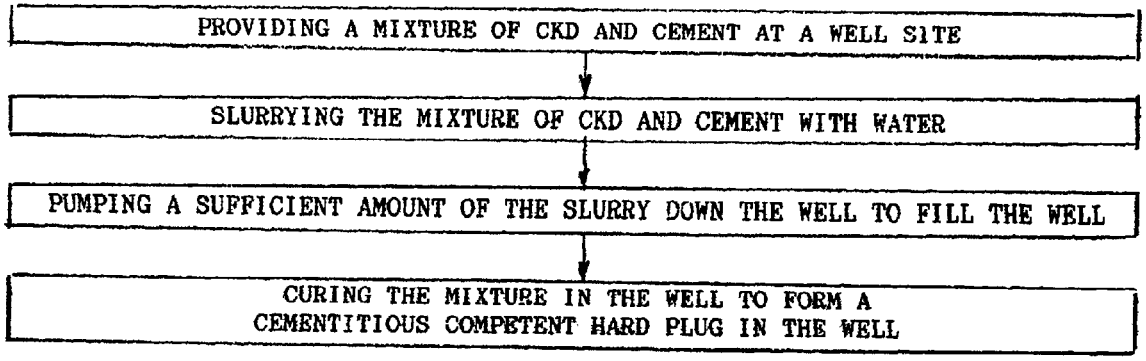
FIG. 5 is a flow diagram for a process for producing and transporting a cement-CKD blend to an off-load site and for closing a well.

There is also provided by the principles of this invention a process for closing a well comprising providing a mixture of CKD and cement at a well site, slurrying the mixture of CKD and cement with water, pumping a sufficient amount of the slurry down the well to fill the well, and curing the mixture in the well to form a cementitious competent hard plug in the well as illustrated in FIG. 5.

Figure 6:
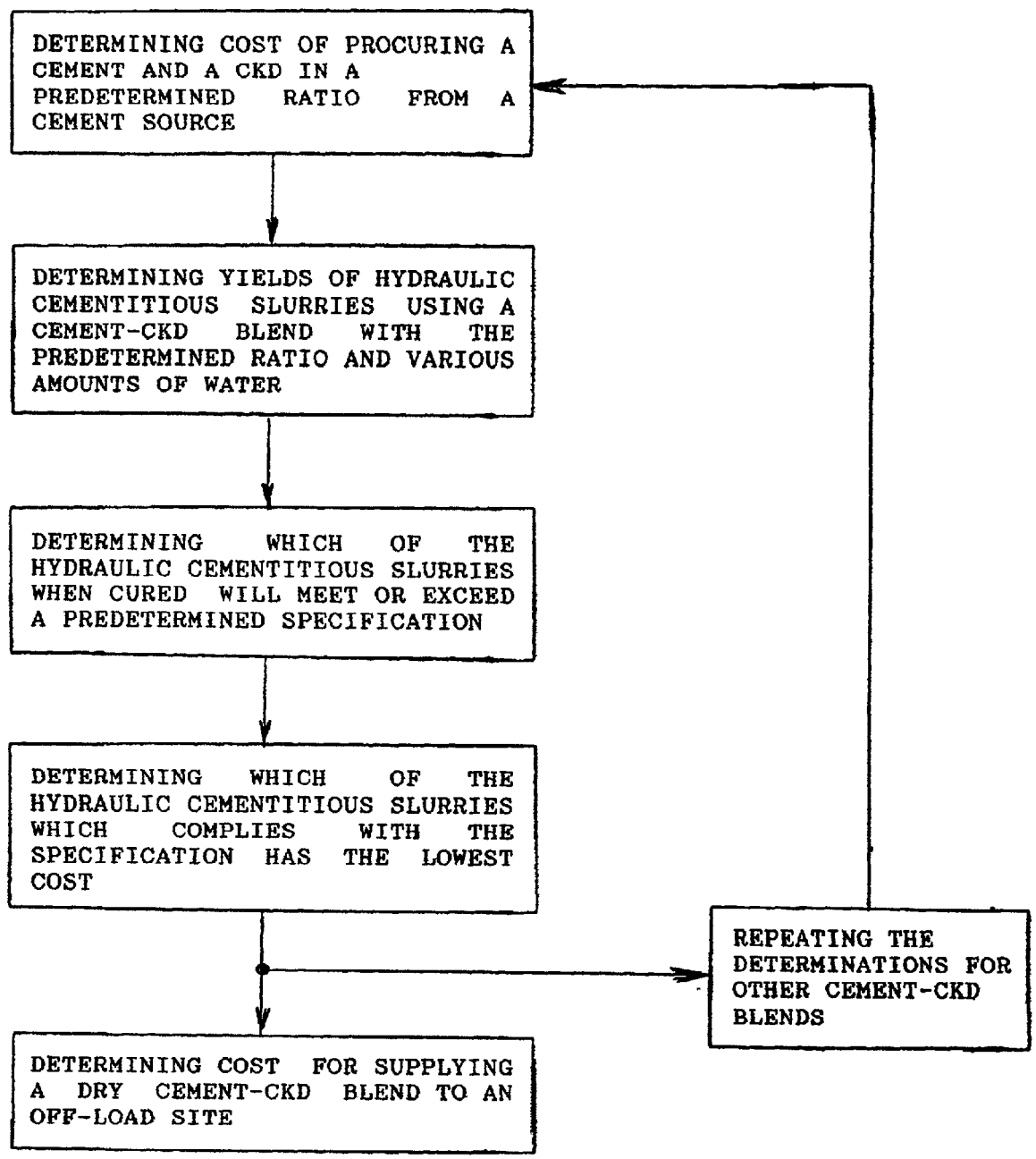
FIG. 6 is a diagram for a method of determining cost per unit volume of the hydraulic cementitious slurry.

Accordingly, as illustrated in FIG. 6, there is also provided by the principles of this invention a method of determining a lowest cost per unit volume of a hydraulic cementitious slurry comprising determining cost of procuring a cement and a CKD in a predetermined weight ratio of cement to CKD at and from a cement source. Then determining yields of hydraulic cementitious slurries formed by flurrying a dry cement-CKD blend having the predetermined weight ratio of cement to CKD with various amounts of water.

Then determining which of the hydraulic cementitious slurries when cured over a predetermined period of time will meet or exceed a predetermined specification, and then determining a hydraulic cementitious slurry having a lowest cost per unit volume using the dry cement-CKD blend and which meets or exceeds the predetermined specification.

In a further embodiment, the method also includes determining a cost for supplying the dry cement-CKD blend from the cement source to an off-load site using the hydraulic cementitious slurry determined to have the lowest cost per unit volume and which meets or exceeds the predetermined specification.

In another further embodiment, the method includes repeating the above determinations for other ratios of cement to CKD. For example, determining cost of procuring the cement and the CKD in another predetermined weight ratio of cement to CKD at and from the same cement source. Then determining yields of hydraulic cementitious slurries formed by slurrying a dry cement-CKD blend having the new predetermined weight ratio of cement to CKD with various amounts of water.

Then determining which of the hydraulic cementitious slurries when cured over a predetermined period of time will meet or exceed the same predetermined specification, and then determining a hydraulic cementitious slurry having a lowest cost per unit volume using the new dry cement-CKD blend and which meets or exceeds the predetermined specification. At this stage in the method the lowest cost hydraulic cementitious slurry has been determined for slurries with two cement-CKD blends from the same sort but with different ratios of cement to CKD. Unless there are other factors to consider, the method now calls for selecting the cement-CKD blend which results in the lowest cost for producing a hydraulic cementitious slurry which meets or exceeds the predetermined specification.

The method can be repeated for yet another cement-CKD blend having another ratio of cement to CKD. For example, three dry cement-CKD blend which are particularly useful are 2/3, 1/1 and 3/2 parts of cement to parts of CKD where the hydraulic cementitious slurry to be produced is to be used for closing wells This invention, however, is not limited just to the closing of wells and other uses of the hydraulic cementitious slurries of this invention can of course be used for different purposes. Such other purposes can have different specifications for the resulting cured product.

While the preferred embodiments of the present invention have been described, various changes, adaptations and modifications may be made thereto without departing from the spirit of the invention and the scope of the appended claims. The present disclosure and embodiments of this invention described herein are for purposes of illustration and example and modifications and improvements may be made thereto without departing from the spirit of the invention or from the scope of the claims. The claims, therefore, are to be accorded a range of equivalents commensurate in scope with the advances made over the art.

TABLE II

MATERIAL BLENDS FOR SP 50 SLURRY MIX

| | | | | COMPRESSIVE STRENGTH IN PSI | | | | | |
| --- | --- | --- | --- | --- | --- | --- | --- | --- | --- |
| CEMENT | CKD | WATER | DENSITY | 24 HOUR | 7 DAY | 14 DAY | 28 DAY | YIELD | COST |
| 70% | 30% | 10 | 97.41 | ND | ND | ND | ND | 1.82 | $1.31 |
| 60% | 40% | 6.5 | 108.14 | 1310 | 2740 | ND | ND | 1.37 | $1.55 |
| 60% | 40% | 7 | 105.77 | 1270 | 2480 | ND | ND | 1.44 | $1.47 |
| 60% | 40% | 8 | 102.31 | ND | ND | ND | 1340 | 1.57 | $1.35 |
| 60% | 40% | 9 | 99.39 | 510 | 1180 | ND | 1270 | 1.7 | $1.24 |
| 60% | 40% | 10 | 96.88 | ND | 670 | ND | 1080 | 1.83 | $1.16 |
| 50% | 50% | 6.5 | 107.35 | 1095 | 2130 | ND | ND | 1.38 | $1.33 |
| 50% | 50% | 8 | 102.32 | ND | ND | ND | 1240 | 1.57 | $1.16 |
| 40% | 60% | 7 | 105.04 | ND | ND | ND | 1430 | 1.45 | $1.06 |
| 40% | 60% | 8 | 101.67 | ND | ND | ND | ND | 1.58 | $0.98 |

WATER IS GALLONS PER 94 Lb. SACK
DENSITY IS POUNDS PER CUBIC FOOT
COMPRESSIVE STRENGTH RESULTS - ASTM C 39 TEST
YIELD IS NET VOLUME IN CUBIC FEET FOR GALLONS OF WATER PLUS ONE 94 Lb. SACK
COST IS: COST PER CUBIC FOOT OF SLURRY.
ND = NOT DETERMINED
THE CKD UTILIZED FOR ALL RESULTS IN THIS TABLE WAS SUPPLIED BY SOURCE I OF TABLE IV

TABLE III

APPROVED MATERIALS UTILIZED IN SLURRY MIXES
PRIOR ART FOR WELL SLURRY MEETING API SPECIFICATIONS

| CEMENT | SILICA | WATER | DENSITY | COMPRESSIVE STRENGTH IN PSI | YEILD | COST |
| --- | --- | --- | --- | --- | --- | --- |
| 50% | 50% | 8 | 101.03 | MEETS API SPECIFICATIONS | 1.59 | $2.32 |
| 50% | 50% | 9 | 98.23 | MEETS API SPECIFICATIONS | 1.72 | $2.15 |

CEMENT TYPICALLY UTILIZED IS G SERIES PORTLAND CEMENT $75.00 PER TON
SILICA TYPICALLY UTILIZED IS A 200 MINUS SIEVE SPEC PRODUCT $82.50 PER TON
THESE SLURRY MIXES MEET API SPECIFICATION OF A HARD PLUG OF 1000 PSI COMPRESSIVE STRENGTH
COST IS: COST PER CUBIC FOOT OF SLURRY

TABLE IV

TYPICAL CHEMICAL ANAYLSIS FOR CEMENT KILN DUSTS

| | CEMENT KILN DUST SOURCE | | | | | |
| --- | --- | --- | --- | --- | --- | --- |
| SOURCE OF CKD | I | II | III | IV | V | VI |
| INGREDIENT | % | % | % | % | % | % |
| $SiO_2$ | 12.3 | 17.19 | 17.61 | 9.9 | 22.4 | 14.6 |
| $Al_2O_3$ | 3 | 4.34 | 4.25 | 3.1 | 10 | 3.4 |
| $Fe_2O_3$ | 1.3 | 2.13 | 1.48 | 1.2 | 4.1 | 2.2 |
| CaO | 52.6 | 43.49 | 62.49 | 47.6 | 19.4 | 46.5 |

TABLE IV-continued

TYPICAL CHEMICAL ANAYLSIS FOR CEMENT KILN DUSTS

| | CEMENT KILN DUST SOURCE | | | | | |
|---|---|---|---|---|---|---|
| SOURCE OF CKD INGREDIENT | I % | II % | III % | IV % | V % | VI % |
| MgO | 1.4 | 0.7 | 1.18 | 1.3 | 0.6 | 2 |
| SO$_3$ | 3.7 | 1.34 | 8.79 | 0.9 | 10.1 | 5 |
| Na$_2$O | 0.1 | 0.43 | ND | 0.1 | 0.9 | 0.9 |
| K$_2$O | 2.4 | 1.44 | 2.86 | 1.1 | 14.1 | 5.1 |
| LOSS ON IGNITION | 23.3 | 29.6 | ND | 31.6 | 13.2 | 21.4 |
| FREE LIME | 16.9 | ND | ND | ND | ND | ND |

SOURCES IV, V, AND VI ARE EXAMPLES OF CKD WITH LARGE VARIATIONS OF SiO$_2$ AND CaO AS REPORTED IN U.S. PAT. NO. 4,432,800. THESE VARIATIONS DO NOT PRECLUDE THEIR USE IN THIS INVENTION.
FREE LIME: IDENTIFIED SEPERATLY IN CHEMICAL ANALYSIS BUT INCLUDED IN TOTAL FOR CaO.
ND = NOT DETERMINED

What is claimed is:

1. A dry blended cementitious composition comprising consisting of cement and CKD as major components and having a weight ratio of cement to CKD between about 2/3 and 3/1.

2. The dry cementitious composition of claim 1, wherein the weight ratio is no greater than about 7/3.

3. The dry cementitious composition of claim 1, wherein the weight ratio is no greater than about 3/2.

4. A hydraulic cementitious slurry comprising:
a predetermined amount of a dry blended cementitious composition which comprises consisting of cement and CKD as major components and has with a weight ratio of cement to CKD is between about 2/3 and 3/1; and
a predetermined amount of water of at least about 6 gallons per 94 lb. sack of the dry cementitious composition.

5. The hydraulic cementitious slurry of claim 4, wherein the weight ratio of cement to CKD is no greater than about 7/3.

6. The hydraulic cementitious slurry of claim 4, wherein the weight ratio of cement to CXD is no greater than about 3/2.

7. The hydraulic cementitious slurry of claim 4, wherein the predetermined amount of water is no greater than about 12 gallons per sack of the dry cementitious composition.

8. A hard cured cementitious body produced by curing the hydraulic cementitious slurry of claim 4, wherein the predetermined amount of a the dry blended cementitious composition which comprises cement and CKD, the weight ratio of cement to CKD, and the predetermined amount of water per 94 lb. sack of the dry blended cementitious composition are effective values for causing the hard cured cementitious body to have a compressive strength of at leant about 1000 psi and a maximum permeability no greater than 0.1 md.

9. A dry blended cementitious composition comprising CKD and cement,
wherein the cement is about 40% by weight of the dry blended cementitious composition, and
the CKD is about 60% by weight of the dry blended cementitious composition.

10. A blended dry cementitious composition comprising CKD and cement,
wherein the cement is about 50% by weight of the dry blended cementitious composition, and
the CKD is about 50% by weight of the dry blended cementitious composition.

11. A dry blended cementitious composition comprising CKD and cement,
wherein the cement is about 60% by weight of the dry blended cementitious composition, and
the CKD is about 40% by weight of the dry blended cementitious composition.

12. A dry blended cementitious composition comprising CKD and cement,
wherein the cement is about 70% by weight of the dry blended cementitious composition, and
the CKD is about 30% by weight of the dry blended cementitious composition.

13. A hydraulic cementitious slurry comprising:
a predetermined amount of the dry blended cementitious composition of claim 9; and
a predetermined amount of water of at least about 6 gallons per 94 lb. sack of the dry blended cementitious composition.

14. A hydraulic cementitious slurry comprising:
a predetermined amount of the dry blended cementitious composition of claim 11; and
a predetermined amount of water of at least about 6 gallons per 94 lb. sack of the dry blended cementitious composition.

15. A hydraulic cementitious slurry comprising:
a predetermined amount of the dry blended cementitious composition of claim 11; and
a predetermined amount of water of at least about 6 gallons per 94 lb. sack of the dry blended cementitious composition.

16. A hydraulic cementitious slurry comprising:
a predetermined amount of the dry blended cementitious composition of claim 12; and
a predetermined amount of water of at learnt about 6 gallons per 94 lb. sack of the dry blended cementitious composition.

* * * * *

UNITED STATES PATENT AND TRADEMARK OFFICE
CERTIFICATE OF CORRECTION

PATENT NO. : 6,767,398 B2  Page 1 of 1
DATED : July 27, 2004
INVENTOR(S) : James H. Trato It is certified that error appears in the above-identified patent and that said Letters Patent is hereby corrected as shown below:

Column 8,
Line 58, Table IV, the second line thereof, change "ANAYLSIS" to -- ANALYSES --.

Column 9,
Line 3, Table IV-continued, the second line thereof, change "ANAYLSIS" to
-- ANALYSES --;
Line 22, delete "comprising";
Line 23, delete "as major components";
Line 32, delete "which comprises";
Line 33, delete "as major components and has";
Line 34, in the word group "CKD is between", delete the word "a";
Line 50, delete "which comprises cement and CKD"; and
Line 54, change "leant" to -- least --.

Column 10,
Line 36, change "of claim 11" to -- of claim 10 --.

Signed and Sealed this

First Day of March, 2005

JON W. DUDAS
*Director of the United States Patent and Trademark Office*

UNITED STATES PATENT AND TRADEMARK OFFICE
CERTIFICATE OF CORRECTION

PATENT NO. : 6,767,398 B2
DATED : July 27, 2004
INVENTOR(S) : James H. Trato

It is certified that error appears in the above-identified patent and that said Letters Patent is hereby corrected as shown below:

Column 8,
Line 58, Table IV, the second line thereof, change "ANAYLSIS" to -- ANALYSES --.

Column 9,
Line 3, Table IV-continued, the second line thereof, change "ANAYLSES" to
-- ANALYSIS --;
Line 22, delete "comprising";
Line 23, delete "as major components";
Line 32, delete "which comprises";
Line 33, delete "as major components and has";
Line 34, in the word group "CKD is between", delete the word "a";
Line 49, in the word group "of a the dry" delete the word "a";
Line 50, delete "which comprises cement and CKD"; and
Line 54, change "leant" to -- least --.

Column 10,
Line 36, change "of claim 11" to -- of claim 10 --.

This certificate supersedes Certificate of Correction issued March 1, 2005.

Signed and Sealed this

Ninth Day of August, 2005

JON W. DUDAS
*Director of the United States Patent and Trademark Office*